(12) United States Patent
Gunawardena et al.

(10) Patent No.: US 7,685,200 B2
(45) Date of Patent: Mar. 23, 2010

(54) RANKING AND SUGGESTING CANDIDATE OBJECTS

(76) Inventors: Dinan Gunawardena, c/o Microsoft Research Ltd, Roger Needham Building, JJ Thomson Avenue, Cambridge, CB3 0FB (GB); Milan Vojnović, c/o Microsoft Research Ltd, Roger Needham Building, JJ Thomson Avenue, Cambridge, CB3 0FB (GB); Richard James Cruise, 5 Suez Road, Cambridge, Cambridgeshire CB1 3OB (GB); Peter Marbach, c/o Department of Computer Science, Bahen Center for Information Technology (BCIT), Room BA5232, University of Toronto, Toronto, Ontario (CA) M5S 3G4

( * ) Notice: Subject to any disclaimer, the term of this patent is extended or adjusted under 35 U.S.C. 154(b) by 349 days.

(21) Appl. No.: 11/681,031

(22) Filed: Mar. 1, 2007

(65) Prior Publication Data
US 2008/0215583 A1    Sep. 4, 2008

(51) Int. Cl.
*G06F 17/30* (2006.01)
(52) U.S. Cl. ................................................ 707/748
(58) Field of Classification Search ...................... 707/7
See application file for complete search history.

(56) References Cited

U.S. PATENT DOCUMENTS

| 5,214,746 | A  | * | 5/1993  | Fogel et al. ............... 706/25 |
| 6,006,218 | A  |   | 12/1999 | Breese et al. |
| 6,266,649 | B1 | * | 7/2001  | Linden et al. ............. 705/26 |
| 6,304,864 | B1 | * | 10/2001 | Liddy et al. .............. 706/15 |
| 6,757,691 | B1 | * | 6/2004  | Welsh et al. ............ 707/104.1 |
| 7,139,757 | B1 |   | 11/2006 | Apollonsky et al. |
| 2002/0042923 | A1 |   | 4/2002 | Asmussen et al. |
| 2003/0135490 | A1 |   | 7/2003 | Barrett et al. |
| 2005/0015394 | A1 | * | 1/2005 | McKeeth ................... 707/100 |
| 2005/0071255 | A1 | * | 3/2005 | Wang et al. .................. 705/27 |
| 2005/0114357 | A1 |   | 5/2005 | Chengalvarayan et al. |

(Continued)

FOREIGN PATENT DOCUMENTS

WO    WO2007019311    2/2007

(Continued)

OTHER PUBLICATIONS

"Position Paper, Tagging, Taxonomy, Flickr, Article, ToRead," by Marlow et al, In: Proc. of Collaborative Web Tagging Workshop at WWW2006, May 22-26, 2006, 9 pages. Available at http://www.semanticmetadata.net/hosted/taggingws-www2006-files/29.pdf.*

(Continued)

*Primary Examiner*—Neveen Abel-Jalil
*Assistant Examiner*—Daniel Kinsaul
(74) *Attorney, Agent, or Firm*—Lee & Hayes, PLLC

(57) ABSTRACT

A method of ranking and suggesting objects, such as tags, is described in which a group of objects are suggested to a user in relation to a particular information object, such as a web page or file. A user either selects one of the suggestions or enters an alternative object and on receipt of data identifying the particular object selected by the user, the group of suggestions is updated based on whether the object selected by the user was one of the suggestions or not. The updating of the group may also be based on other factors, such as ranking parameters associated with each of the objects.

18 Claims, 11 Drawing Sheets

U.S. PATENT DOCUMENTS

| | | | |
|---|---|---|---|
| 2006/0195442 A1* | 8/2006 | Cone et al. | 707/5 |
| 2006/0200434 A1 | 9/2006 | Flinn et al. | |
| 2006/0218141 A1 | 9/2006 | Tuttle et al. | |
| 2006/0235810 A1 | 10/2006 | Wen et al. | |
| 2007/0016553 A1 | 1/2007 | Dumais et al. | |
| 2007/0027753 A1* | 2/2007 | Collins | 705/14 |
| 2007/0038646 A1 | 2/2007 | Thota | |
| 2007/0078832 A1* | 4/2007 | Ott et al. | 707/3 |
| 2007/0088735 A1* | 4/2007 | Aggarwal et al. | 707/102 |
| 2007/0118508 A1* | 5/2007 | Svendsen | 707/3 |
| 2007/0174247 A1* | 7/2007 | Xu et al. | 707/3 |
| 2008/0010249 A1* | 1/2008 | Curtis et al. | 707/3 |
| 2008/0034291 A1* | 2/2008 | Anderson et al. | 715/700 |
| 2008/0059897 A1* | 3/2008 | Dilorenzo | 715/764 |
| 2008/0072145 A1* | 3/2008 | Blanchard et al. | 715/273 |
| 2008/0195657 A1* | 8/2008 | Naaman et al. | 707/104.1 |

OTHER PUBLICATIONS

"Forecasting Sales by Exponentially Weighted Moving Averages," by Winters, Peter. IN: Management Science, vol. 6, No. 3 (Apr. 1960) pp. 324-342. Available at jstor.org. Last visited: Oct. 19, 2009.*

Eiron, et al., "Ranking the Web Frontier", available at least as early as Feb. 27, 2007, at <<http://delivery.acm.org/10.1145/990000/988714/p309-eiron.pdf?key1=988714&key2=8062652711&coll=GUIDE&dl=GUIDE&CFID=15447622&CFTOKEN=72162271>>, ACM, 2004, pp. 309-318.

Golder, et al., "The Structure of Collaborative Tagging Systems", available at least as early as Feb. 28, 2007, at <<http://www.hpl.hp.com/research/idl/papers/tags/tags.pdf>>, pp. 1-8.

Golder, et al., "The Structure of Collaborative Tagging Systems", available at least as early as Feb. 28, 2007, pp. 1-8.

Phatarfod, "On the Matrix Occurring in a Linear Search Problem", available at least as early as Feb. 28, 2007, pp. 1-11.

Xu, et al., "Towards the semantic web: Collaborative Tag Suggestions", available at least as early as Feb. 28, 2007, pp. 1-8.

Xu, et al., "Towards the Semantic Web: Collaborative Tag Suggestions", available at least as early as Feb. 28, 2007, at <<http://www.rawsugar.com/www2006/13.pdf>>, pp. 1-8.

* cited by examiner

RANKING AND SUGGESTING CANDIDATE OBJECTS

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Users of information systems, such as the web, often require the ability to find information that they have previously found. One solution to this which has been implemented in web browsing applications is the ability to store a list of favourites (also referred to as bookmarks), which have a title and link to a particular web page. This enables a user to revisit a previously visited and bookmarked web page. However, users may collate large numbers of favourites, and although these may be arranged in a folder structure, it may still be difficult to navigate through. Another solution to aid retrieval of web pages (or other objects) that a user has previously visited is to enable the user to apply one or more tags (or keywords) to the web page along with a location reference to that object. These tags may subsequently be searched in any combination and this provides a more flexible way for a user to find previously visited material.

In order to improve the ability to retrieve web pages that a user has not previously tagged, but may be related to one that a user has tagged, some web sites have incorporated collaborative tagging. This technique enables a user to search for a web page (or other object) based on the tags applied to that object by other users of the same system. In order for such collaborative systems to be effective, the tags applied to an object should be prioritized (or ranked) according to their relative relevance/applicability to the particular object. However, it may require a large number of tagging events before the system reaches a state where the top n ranked tags are stable (i.e. they do not keep churning).

In order to improve the ranking of the tags and the time taken for the identified tags to converge on a prioritized list which is a true representation of each tags true popularity rank with respect to an object, some systems which use collaborative tagging also offer suggestions to a user when attempting to apply a tag to a web page. These suggestions may be based on the tags already applied to the same object by other users of the system. A known method of selecting tags to be suggested to a user is referred to as 'Top Popular' which selects a fixed number of the current most popular tags (i.e. those tags most often used by users) for a particular web page (e.g. the six most commonly used tags for a web page may be presented to a user as the suggested tags for the web page). However, problems arise where a user idly selects one or more of the suggested tags without application of their own judgment (this is referred to herein as 'user imitation'). This can distort the ranking of tags and lead to the ranking converging very slowly on a true representation of each tags true popularity rank, or in some circumstances the ranking may not converge at all.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A method of ranking and suggesting objects, such as tags, is described in which a group of objects are suggested to a user in relation to a particular information object, such as a web page or file. A user either selects one of the suggestions or enters an alternative object and on receipt of data identifying the particular object selected by the user, the group of suggestions is updated based on whether the object selected by the user was one of the suggestions or not. The updating of the group may also be based on other factors, such as ranking parameters associated with each of the objects.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The term 'tag' is used herein to refer to a label which is applied to an information object and which describes the information object or captures how the object fits into an information organization scheme. The tag may be a textual keyword such as a single word (e.g. 'music') or short phrase (e.g. 'motor racing'), a picture, an audio annotation, a gesture captured by motion capture (e.g. a digital ink input or physical dance sequence for a dancing computer game) or any other object. The information object may be a web page, a document, a video, an image or any other data element.

Figure 1:
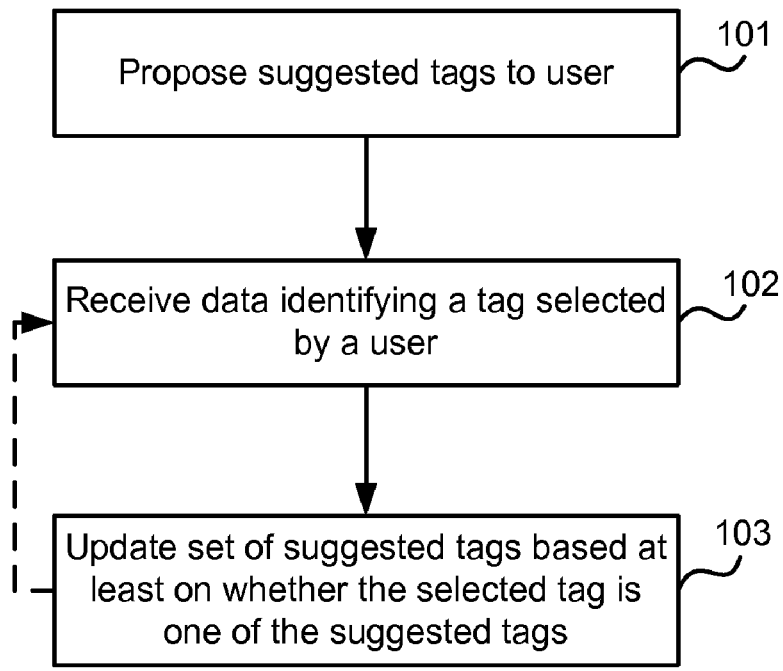
FIG. 1 shows a first example flow diagram of a method of ranking and suggesting candidate objects.

FIG. 1 shows a first example flow diagram of a method of ranking and suggesting candidate objects. Various example applications for this method (and the other methods described herein) and an example system for implementation of this method (and the other methods described herein) are described below. In this example the candidate objects are tags. According to the method a set of suggested tags (also referred to as the 'suggestion set') for a particular information object are proposed to the user (block 101) and data identifying a tag selected by the user is received (block 102). The set of suggested tags is then updated dependent (at least) on whether the selected tag is one of the set of suggested tags (block 103), i.e. whether the data received in block 102 corresponds to one of the tags presented in block 101. As described in more detail below, the updating may be additionally based on other factors such as rankings (or other parameters) associated with each tag and/or eligibility criteria. In other examples, the updating may be further based on a random variable such that updating occurs only if the variable exceeds a defined threshold (as described in more detail below).

Where a user identifies more than one tag for a particular information object, the process may be repeated (blocks 102 and 103, as indicated by the dotted arrow) however the suggested set which is proposed to the user may, in this example, not be refreshed within the particular tagging session (i.e. on input of the first selected tag, the set of suggestions proposed to the user does not change). In other examples, if the updating of the suggestion set (in block 103) results in a change to the suggestion set, the updated suggestion set may be proposed to the user (i.e. in this example, blocks 101-103 are repeated instead of blocks 102-103 as shown in FIG. 1).

The term 'updating' is used herein with regard to the suggestion set to refer to the re-evaluation of the members of the suggestion set according to particular criteria and/or algorithms. The re-evaluation (and therefore the updating) may result in the members of the suggestion set changing or alternatively the members of the suggestion set, after re-evaluation, may be the same as they were prior to the re-evaluation.

The proposing of the suggestion set to the user (block 101) may be achieved in many different ways, including through displaying all the elements of the suggestion set to the user or using the members of the suggestion set to auto-complete tags as the user enters them. An example user interface (UI) is described below. The step of proposing the suggestion set may comprise accessing the suggestion set, which may be stored in local memory or in a remote database, and displaying the suggested tags to the user in any suitable manner.

When the method is initiated, the suggestion set for a particular information object may be empty, because there may be no candidate tags for that object. In some examples, the suggestion set may be initially populated with tags based on the meta-data for the particular information object (e.g. the meta-data for a web page) or based on any aspect of the information object (e.g. an initial suggestion set for a particular file type may be provided).

The term 'candidate tag' is used herein to refer to each tag which has been assigned to a particular information object at least once and is therefore a candidate for inclusion within the suggestion set for that object. Each candidate tag may have an associated count which is incremented each time the candidate tag is selected by a user. In addition, or instead, each candidate tag may have other parameters, such as a vote count or ranking which is updated using one of the methods described below. The updating of one or more of these parameters may occur at any suitable point in the methods (e.g. in block 102 or 103 in FIG. 1). These parameters associated with each candidate tag, which may be stored in a database, may be used in some methods in the determination of the members of the suggestion set.

Members of the suggestion set may be identified in a database by means of a flag which denotes whether the candidate tag is a member of the suggestion set or not. Alternatively, the members of the suggestion set may be stored in a separate table or any other suitable method may be used.

Figure 9:
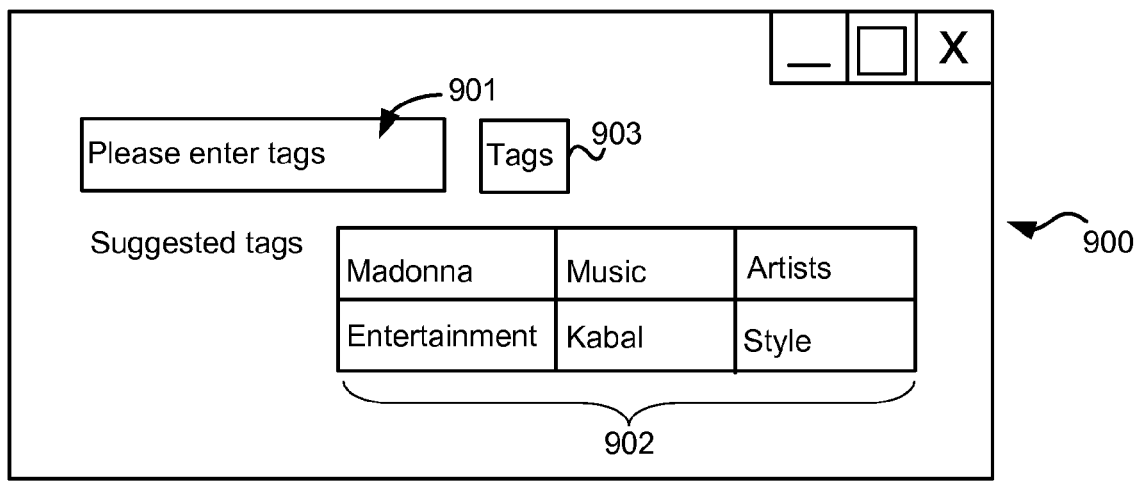
FIGS. 9 and 10 show example user interfaces.

The user may identify a tag in any suitable manner, including by typing the tag into a user entry box or by clicking on one of the suggested tags. An example of a UI for tag entry is shown in FIG. 9 and described below. The data identifying the selected tag, received in block 102, may be in any suitable form (e.g. a string, a code identifying a button selected etc).

Figure 2:
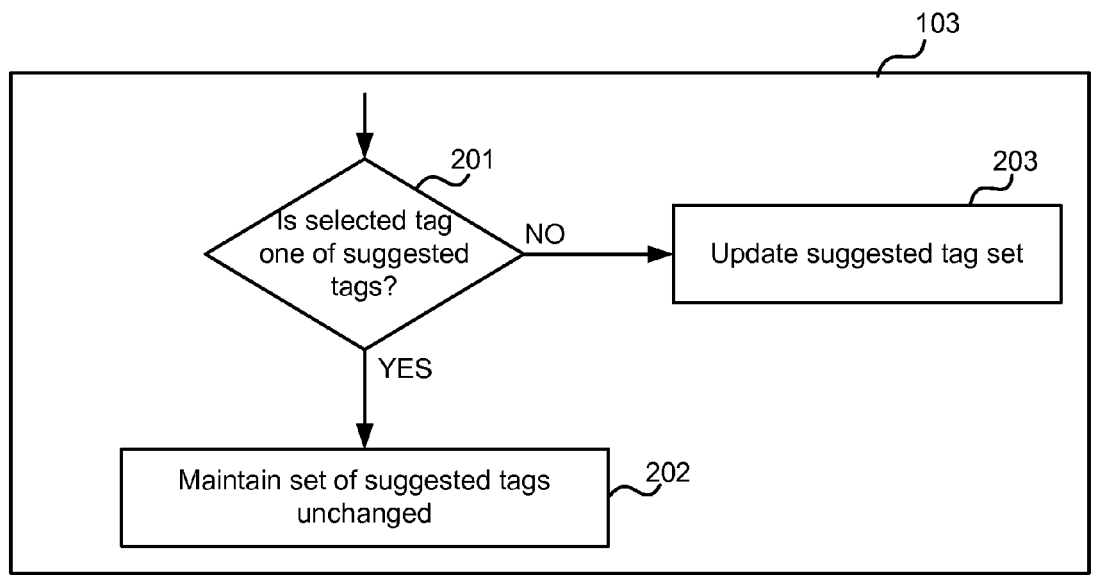
FIG. 2 shows an example method of updating the suggested tag set.

There are a number of different algorithms that may be used to select tags for suggestion to the user (i.e. to determine the members of the set of suggested tags, S) and to update that set (in block 103). FIG. 2 shows an example method of updating the suggested tag set dependent, at least, on whether the selected tag is one of the suggestion set (block 103). In this method, it is determined whether the selected tag is one of the suggested tags (block 201). If the selected tag is one of the suggested tags ("Yes" in block 201), the set of suggested tags, which may be stored in a database, is not updated (block 202). However, the selected tag is not one of the suggested tags ("No" in block 201), the set of suggested tags for that particular information object is updated (block 203). This updating of the set of suggested tags (block 203) is described in more detail below.

Where an analogue tag is used, rather than a textual keyword, a form of quantization function or discrimination function may be required to be able to compare "tags" for equality (e.g. in block 201).

Figure 3:
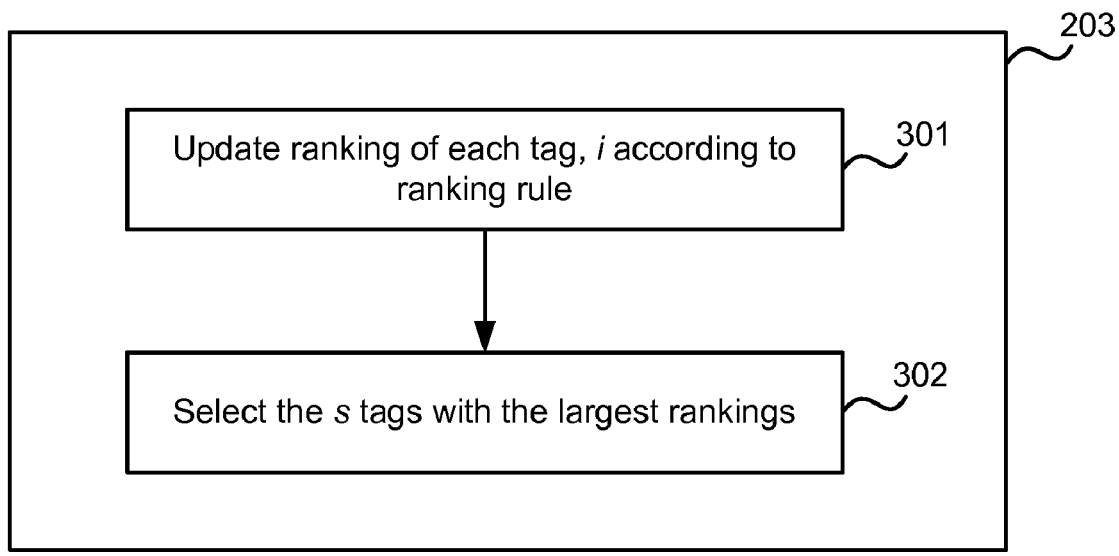
FIGS. 3 and 4 show one of the steps in the method of FIG. 2 in more detail.

In a first example method of determining the members of the suggestion set and updating that set (block 203), the 'Top Popular' algorithm may be used in combination with a new rule for ranking the tags (referred to herein as 'rank rule 2'), as shown in the example flow diagram of FIG. 3. The 'Top Popular' algorithm can be expressed as:

---

At the $t^{th}$ vote (also referred to as the $t^{th}$ tagging event):
    Update ranking, $\rho$ of each tag, i, based on ranking rule (block 301)
    $S \leftarrow$ top-s largest $\rho$ candidates (block 302)

---

Where s is the number of tags in the set of suggested tags, S, and the rule for ranking the tags can be expressed as:

---

If candidate i is selected and is not in the suggestion set:
    For each candidate j not in the suggestion set:
        If $j = i : p_j \leftarrow (1-1/t)p_j + 1/t$
        else $p_j \leftarrow (1-1/t)p_j$

---

As the ranking of each tag is only updated if the tag selected is not in the set of suggested values, the set of suggested tags, which comprises the highest ranked tags, only changes in these circumstances. This results in the algorithm being immune to user imitation.

In a variation of the method shown in FIG. 3 and described above, an alternative algorithm may be used to select the tags for the suggestion set (in block 302). For example, the 'Frequency Proportional' algorithm, as described in more detail below, may be used for this selection step.

Figure 4:
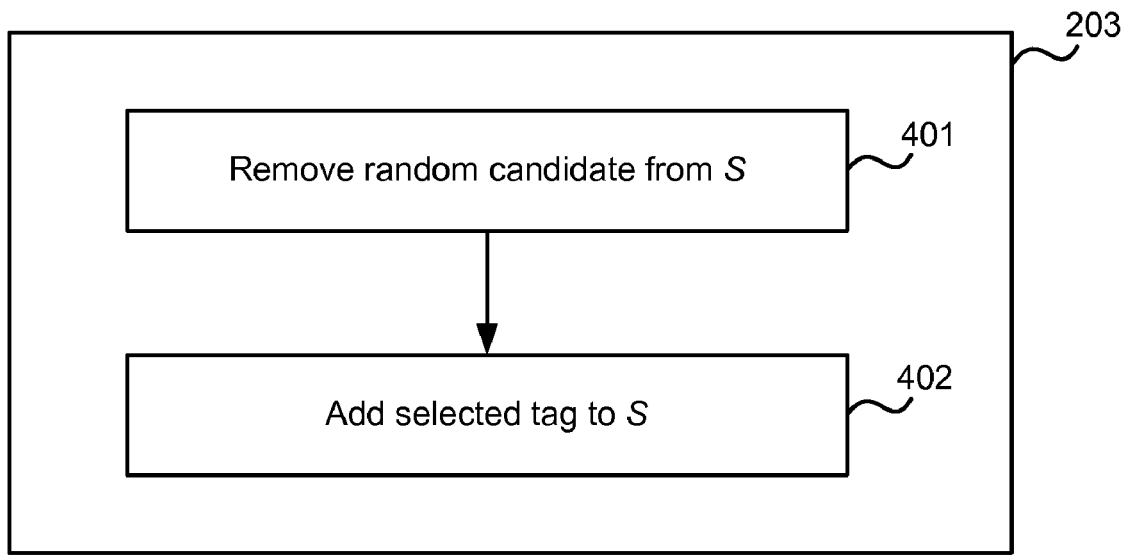

In a second example, an algorithm referred to herein as 'Move to Set' may be used, as shown in the example flow diagram of FIG. 4. This algorithm can be expressed as:

```
At the t^th vote with candidate i selected:
    If candidate i not in suggestion set S ("No" in block 201)
        Remove a random candidate from S (Block 401)
        Add i to S (Block 402)
```

The 'Move to Set' algorithm updates the suggestion set incrementally updated based on the current suggestion set and the selected candidate at a voting instance (also referred to as a tagging event). If the selected candidate is in the suggestion set, nothing happens ("Yes" in block 201, followed by block 202). Otherwise, the selected candidate replaces a randomly chosen candidate from the suggestion set (blocks 401 and 402).

Figure 5:
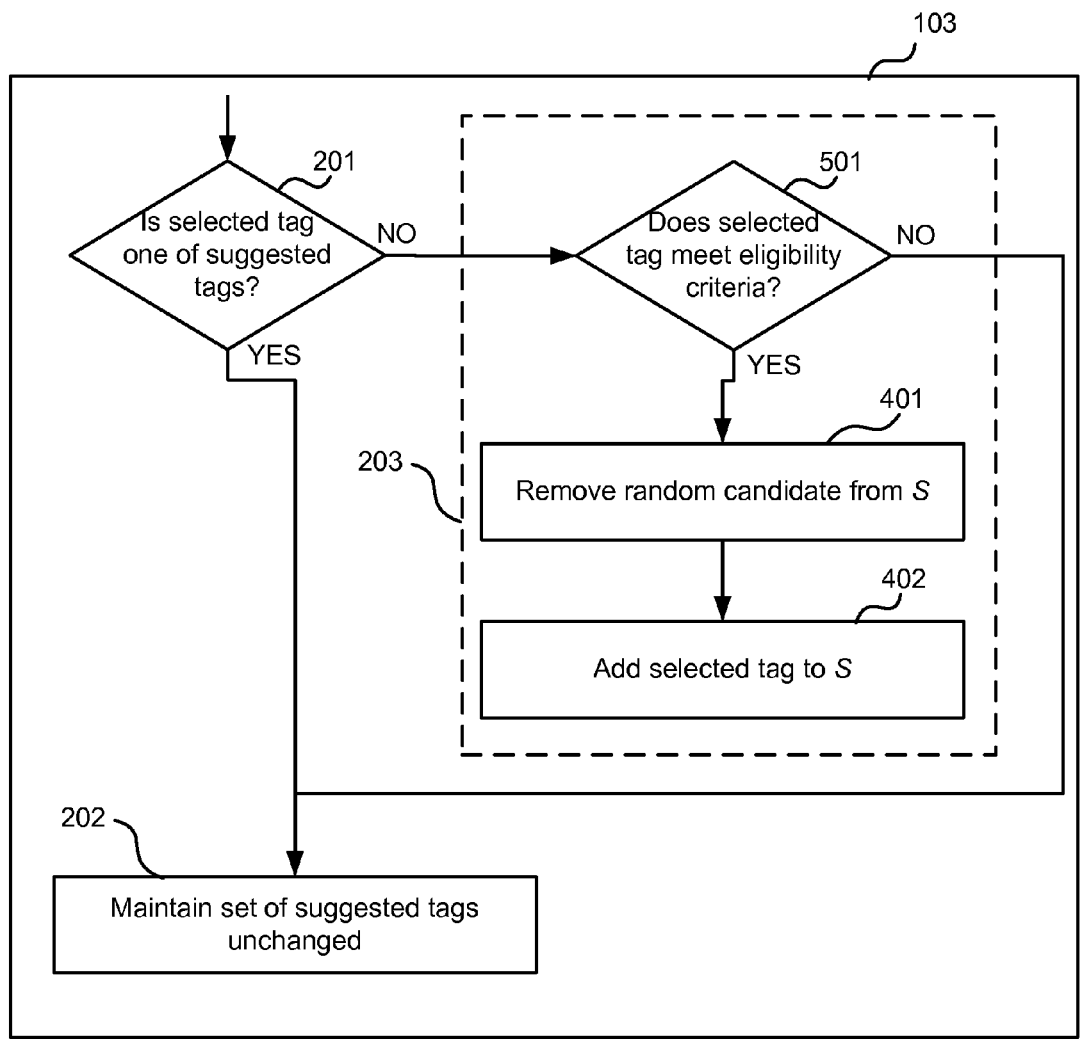
FIG. 5 shows another example method of updating the suggested tag set.

In a further example, a variant of the algorithm shown in FIGS. 2 and 4 may be used, referred to herein as 'Frequency Move to Set' and as shown in the example flow diagram of FIG. 5. This algorithm introduces eligibility criteria for the selected tag (assessed in block 501) which determine whether the selected tag replaces a randomly selected tag from the suggestion set (blocks 401 and 402). If the particular tag does not meet the eligibility criteria ("No" in block 501), the set of suggested tags is left unchanged (block 202). This results in the suggestion set containing only tags which have a minimum level of popularity and avoids inclusion of rare, irrelevant and potentially incorrect tags (which will not be identified by many users) in the suggestion set.

In an example the eligibility criteria may be defined in terms of a parameter referred to as the 'vote count' for each candidate tag. The eligibility criteria may state that a selected tag is only eligible for inclusion within the suggestion set if its vote count exceeds that of a tag which is already included in the suggestion set. The vote count may be calculated and updated in any suitable manner, for example by incrementing the vote count for a candidate tag when the tag is selected whilst not being in the set of suggested tags (i.e. the tag has been chosen by the user independently which avoids any positive suggestion effects due to the suggested tags). In an example the 'Frequency Move to Set' algorithm and eligibility criteria can be expressed as:

```
At the t^th vote with candidate i selected:
    If candidate i not in suggestion set S
        x_i ← (1−1/t)x_i +1/t
        E = {j ∈ S : x_j < x_i}
        If E is nonempty
            Remove a random candidate from S that is in E
            Add i to S
        else x_i ← (1−1/t)x_i
```

Where x is the vote count for each candidate tag.

In this example, the vote count uses frequencies rather than absolute counts. The vote count is updated whether the selected tag, i, is within the suggestion set or not, however, if the selected tag is in the suggestion set, the value of the vote count for the tag is not incremented, but is instead decremented. The updating of the values of the vote counts for tags may be done at any suitable place in the process, for example it may occur after block 102 in FIG. 1 or in block 103 (e.g. after block 201).

In other examples, the eligibility criteria used in the 'Frequency Move to Set' algorithm may be defined in terms of a ranking of tags. The ranking, p, may be defined according to any rule, and two example rules can be expressed as:

```
Rank rule 1:
    If candidate i is selected: p_i ← (1−1/t)p_i +1/t
    Else p_j ← (1−1/t)p_j
Rank rule 2:
    If candidate i is selected and is not in the suggestion set:
        For each candidate j not in the suggestion set:
            If j = i : p_j ← (1−1/t)p_j +1/t
            else p_j ← (1−1/t)p_j
```

Ranking data for tags may also be maintained for other algorithms, and the example described above with reference to FIG. 3 shows use of the 'Top popular' algorithm in combination with rank rule 2. Ranking data may also be maintained for the other algorithms described herein such as 'Move to Set' and 'Frequency Proportional' (described below).

In addition to, or instead of, maintaining ranking data for tags, tag count data may also be maintained where the count associated with a tag may be the number of times that the tag has been used in relation to a particular information object (which provides similar information to rank rule 1) or the number of times that a tag has been used to tag any particular information object by a particular user, set of users, or all users in the system. In some examples, the eligibility criteria may be defined in terms of tag count.

Figure 6:
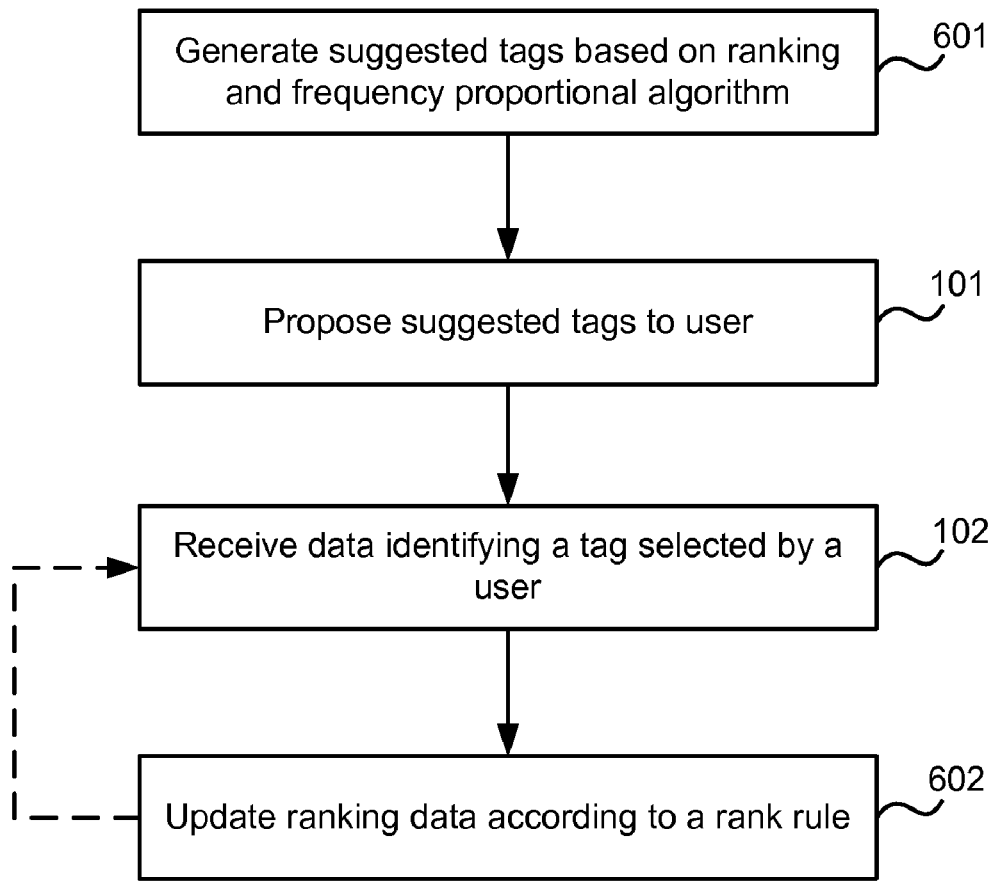
FIGS. 6 and 7 show further example flow diagrams of methods of ranking and suggesting candidate objects.

FIG. 6 shows another example flow diagram of a method of ranking and suggesting candidate objects, in which the suggested set of tags are not stored (as in FIG. 1) but are generated dynamically based on the ranking data for tags. In this example, the suggested tags for a particular information object are generated using an algorithm referred to herein as 'Frequency Proportional' which can be expressed as:

$$\text{At the } t^{th} \text{ vote:}$$
$$\text{Draw a set } S \text{ of } c \text{ candidates at random} \ldots$$
$$\ldots \text{with probability } c \sum_{j \in S} p_j \ldots$$

Where c is the normalization constant.

This method generates the suggestion set by selecting a random set of s candidates from the set of all candidates tags (i.e. all those tags which have been associated with the information object at least once) proportional their current rank sum (block 601). The suggestion set is proposed to the user (block 101) and upon receipt of data identifying a tag selected by the user (in block 102), the ranking data is updated based on a rank rule (block 602). Any suitable rank rule may be used, such as the two rules described above. As mentioned above, other parameters may be maintained for tags (such as tag count) and these may also be updated in block 602.

Figure 7:
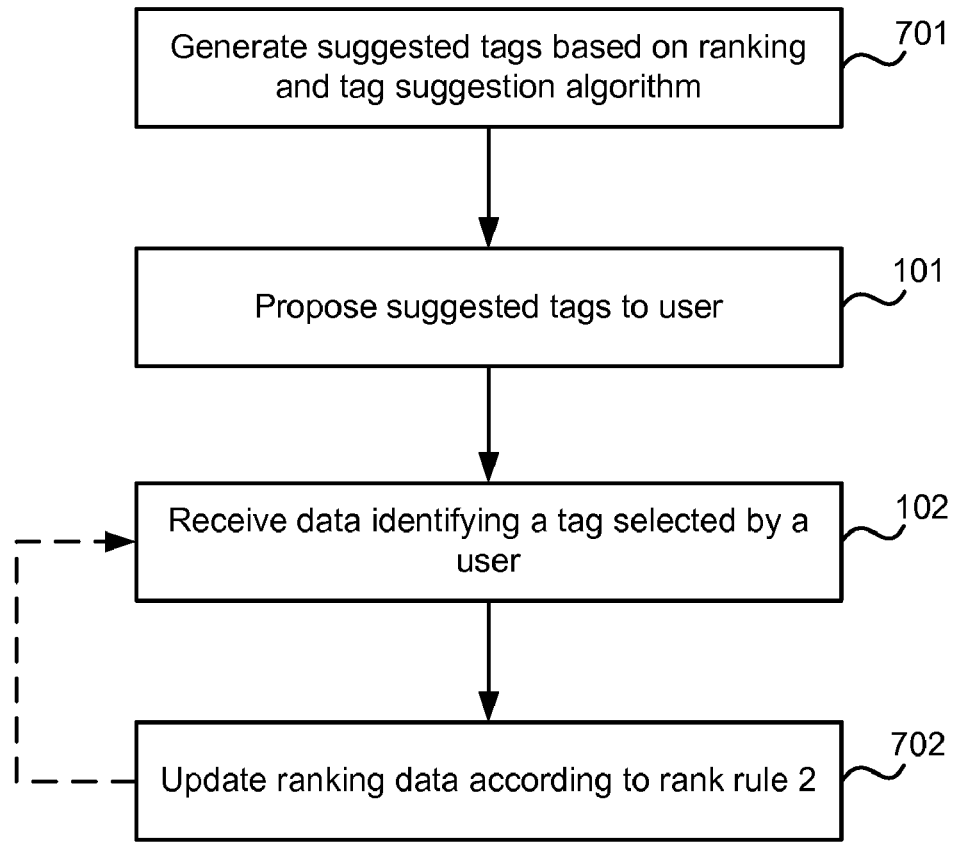

As shown in FIG. 7, in a variation of the method shown in FIG. 6, any tag suggestion algorithm, (such as the 'Top Popular' algorithm, described above in relation to FIG. 3) may be used to generate the suggested set of tags dynamically based on the ranking data (in block 701) which may be updated using rank rule 2 (in block 702).

In further variations of the methods described above and shown in FIGS. 1-7, a random variable may be used in the determination of whether the suggestion set is updated (e.g. in the methods of FIGS. 1-5), whether the ranking data is updated (e.g. in the method of FIGS. 3, 6 and 7), whether the eligibility criteria is updated (e.g. in the method of FIG. 5)

and/or whether any of the parameters stored for each candidate tag (e.g. count, vote count, ranking etc) are updated (in any of the methods). In such an example, a random variable, which may for example be uniformly distributed in the range 0 to 1, is generated for each tagging event. If the value of the variable does not exceed a predefined threshold, p, the updating (e.g. in any of the forms described above) does not occur. However, if the value of the variable equals or exceeds the threshold, p, the updating occurs according to the particular method being used. The value of p may be statically provisioned (e.g. p=0.5) or may be learned dynamically, for example based upon a weighted moving exponential average of the number of user entered tags at any given tagging session. Use of this variable removes certain biases of the user entered tags within a tagging session (i.e. that the tag update events to the suggestion set may be correlated within a tagging session).

The ranking and suggesting methods described above and shown in FIGS. 1-7 eliminate or mitigate the problem of tag reinforcements which may otherwise result from providing tag suggestions to a user.

Whilst the methods described above may be iterating each time a tag is selected for a particular information object (as indicated by the dotted arrows in FIGS. 1, 6, and 7), in some examples the suggestion set may be frozen at some point (e.g. after a defined number of tag events, also referred to as votes, for a particular information object). This reduces the computational load beyond this point. However if the suggestion set is frozen, the tags cannot be changed should an information object subsequently be identified as having relevance in a different topic. In an example, web pages relating to a particular sports team may be assigned a tag which is the name of the captain, the coach and/or the home sports ground of that team. If one of these elements should change after the suggestion set has been frozen, the suggestion set may become out of date such that it no longer reflects the true relevance of the tags associated with the information object.

In the examples above, a single suggestion set is proposed to the user for a session in which they may enter multiple tags for a given information object (as shown by the dotted lines in FIGS. 1, 6 and 7. Whilst the suggestion set and/or ranking data is updated on entry of each tag, the updated set is not presented to the user. However, this is shown by way of example only and in other examples, the updated suggested set may be proposed to the user after the entry of each tag.

Figure 8:
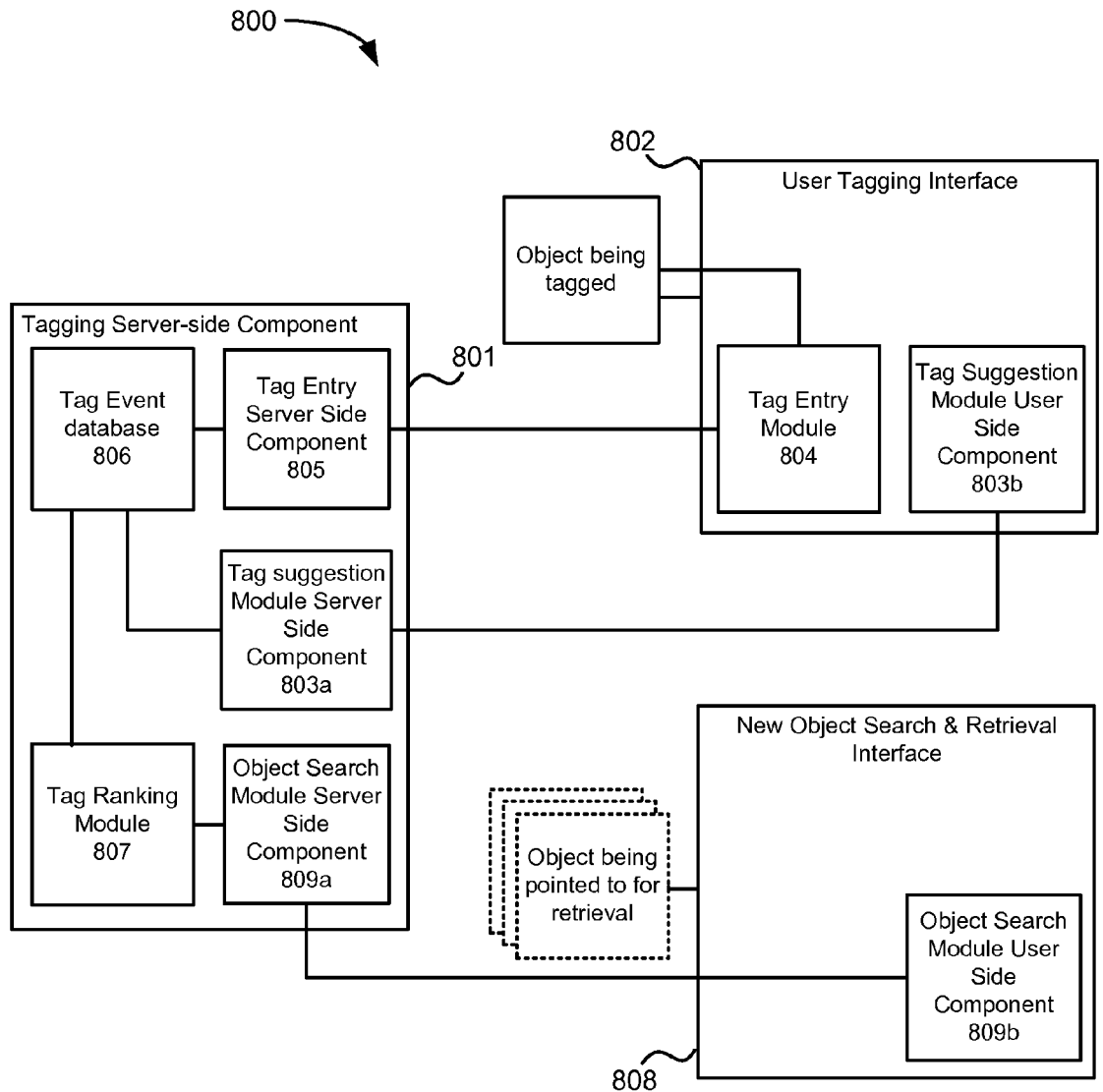
FIG. 8 shows an example system for the implementation of the ranking and suggestion methods described herein.

FIG. 8 shows an example system 800 for the implementation of the ranking and suggestion methods described above. The system comprises a tagging server-side component 801 and a user tagging interface 802 which may comprise an add-in to a web browser, a web page or a web service. The ranking and suggestion of tags (according to one of the methods described above) is performed by a tag suggestion module which may comprise a server-side component 803a and/or a user-side component 803b. The tag entry module 804 in the user tagging interface enables a user to select tags, either from those suggested by the tag suggestion module or by typing in a tag which is different to those suggested to the user. All tag entries are passed from the tag entry module 804 to the tag entry server-side component 805 and are recorded in the tag event database 806 which may also store the current suggestion set (as in FIGS. 1-5, e.g. by means of flags in the database, as described above). In other examples, the suggestion set may be stored elsewhere or the suggestion set may not be stored but instead may be generated dynamically for presentation to the user (as in FIGS. 6 and 7). The data in the tag event database may also include time stamps and/or user IDs associated with the tag events, rank data, vote count data, candidate tags and their associated parameters etc. Different data sets may be maintained for each different model, where the model comprises the ranking and suggestion algorithms used (where more than one is used), the details of the information object and suggestion set size (where more than one value of s may be used).

In an example, the user tagging interface may comprise an add-in for a web browser (e.g. an Internet Explorer (trade mark) tool bar) that enables a user to start a tagging instance in relation to the currently navigated to URL. On launching the tagging application (e.g. by clicking on the tagging button on the new tool-bar), the user may be presented with a tag entry screen 900, for example as shown in FIG. 9, where they may enter one or more tags that they deem relevant for the particular URL. They are presented with a set of suggested tags, as determined by the tag ranking and suggestion algorithms as described above and which may also include pre-configured tags. The user is able to enter new tags (e.g. in text entry box 901) and/or select tags from the set of suggestions 902. The UI also includes a button 903 to enable the user to submit the tags entered.

Whilst in the example UI shown in FIG. 9, information on the popularity (or ranking) of each of the suggested tag is not displayed, in other examples, some information identifying the popularity of each suggested tag may be provided to the user. For example, the most popular tags may be highlighted or the tags may be provided with ranking information or in an order indicative of ranking (e.g. most popular first).

In order that a user can benefit from the collaborative tagging system, the system 800 may also comprise a user object search and retrieval interface 808. The searching, which may be by tag and/or other parameters (e.g. user ID, URL, time stamp etc) may be performed by an object search module which may comprise a server-side component 809a and/or a user-side component 809b. The tagging server-side component 801 may also comprise a tag ranking module 807 which generates output for the object search module.

Figure 10:
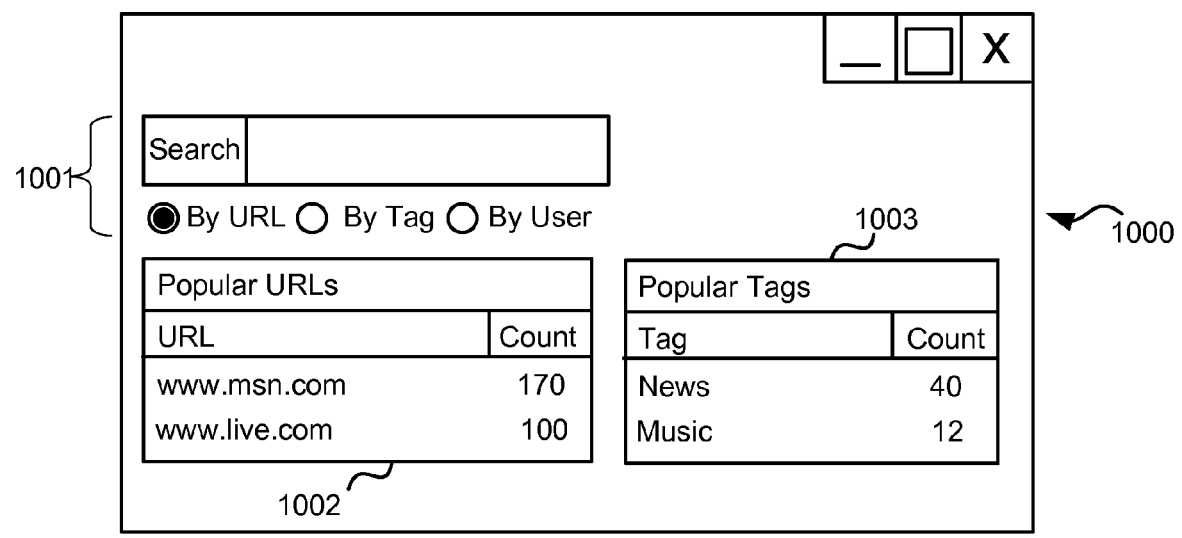

In an example, the add-in (described above) may also enable a user to access URLs previously visited and to search by tag (e.g. the tagging tool-bar may provide a search button). On launching the object search and retrieval interface, the user may be presented with a history/search screen 1000, for example as shown in FIG. 10. The screen may enable the user to search by URL, tag, user etc (using search section 1001) and may also provide information on popular URLs 1002 and popular tags 1003. These popular URLs and tags may be based on the particular user or on everyone using the system. These URLs and tags displayed may be ranked according to the number of tagging events to which they relate (e.g. the number of tagging events associated with a particular URL or the number of times that a particular tag has been allocated to any URL). Other statistics may also be available to the user within this UI.

Figure 11:
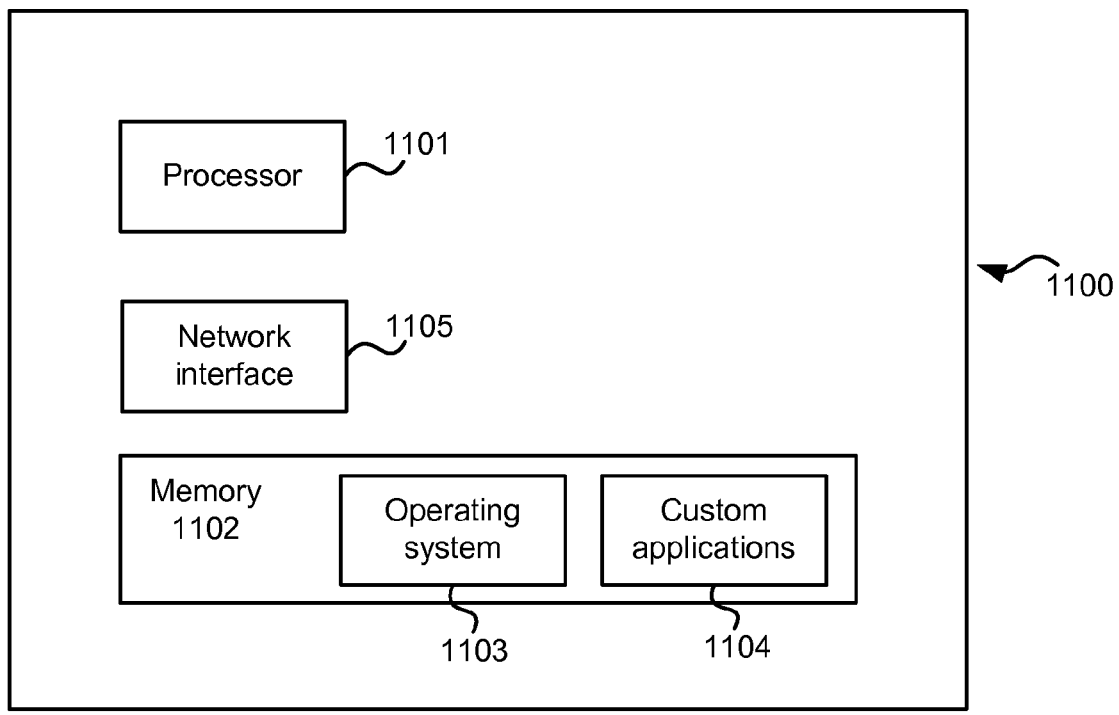
FIG. 11 illustrates an exemplary computing-based device in which embodiments of the methods described above may be implemented. Like reference numerals are used to designate like parts in the accompanying drawings.

FIG. 11 illustrates various components of an exemplary computing-based device 1100 which may be implemented as any form of a computing and/or electronic device, and in which embodiments of the methods described above may be implemented.

The device 1100 comprises one or more processors 1101 which may be microprocessors, controllers or any other suitable type of processors for processing computing executable instructions to control the operation of the device in order to perform any of the methods described above.

The computer executable instructions may be provided using any computer-readable media, such as memory 1102, which may be of any suitable type such as random access memory (RAM), a disk storage device of any type such as a magnetic or optical storage device, a hard disk drive, or a CD, DVD or other disc drive. Flash memory, EPROM or EEPROM may also be used. The memory may be arranged to store platform software comprising an operating system 1103 or any other suitable platform software may be provided at the computing-based device to enable application software 1104 to be executed on the device. The application software may comprise the tagging server-side component 801 or the user tagging interface 802 (as described above). The computing-based device 1100 may further comprise a network interface 1105 if the method is to be operated in a client-server configuration as shown in FIG. 8.

In the methods described above, the suggestion set is proposed to the user (in block 101). In addition to the suggestion set, a number of additional tag suggestions may also be proposed to the user, referred to herein as 'statically provisioned suggestions' or 'preconfigured tags'. These may be suggested to a user irrespective of the particular object being tagged or alternatively, different preconfigured tags may be proposed for each object. These preconfigured tags may be defined by the application based on the meta-data associated with the object or by any other means. The preconfigured tags may always be proposed to the user (in addition to the suggestion set) or may only be used initially (when the suggestion set is empty) or when the number of members within the suggestion set is below a defined threshold.

Whilst in the above examples, the ranking and suggestion methods, UI and system are described in relation to tagging URLs, the methods are suitable for use with any information object, including but not limited to, a web page, a document, a file, a video clip, an image, an audio file etc. In other examples, the information object may be an answer to a question (e.g. on a Q&A page or in a collaborative application), a reputation or perceived skill set for an individual (e.g. rating the expertise of a reviewer on a discussion forum), a search result or an RSS thread (e.g. for retrieval later).

The methods may be used in many different applications for example by a user to search a history of items tagged by that user (e.g. as a form of augmented bookmarks) or for a wider search using keywords which exploits the tagging by others.

The methods described above may also be used to rank and select other candidate objects, where suitable candidate objects include tags. As described above, the tags need not be textual keywords (as in the examples shown above) but may instead be any other object, such as a picture, an audio annotation, a gesture etc.

Although the present examples are described and illustrated herein as being implemented in a client-server based system as shown in FIG. 8, the system described is provided as an example and not a limitation. As those skilled in the art will appreciate, the present examples are suitable for application in a variety of different types of computing systems and dependent on the application, the system may be arranged to run on a standalone computing device (e.g. where the tagging system is being used for desktop search). Where a client-server based system is used, the split of operations between client side and server side may be determined according to the application and security concerns. For example, it may be beneficial to keep the algorithms used for selection and updating of the suggestion set on the server side because they are secure and not available to third parties. However, in other examples, it may be beneficial for the algorithms to run on the client side such that the majority of the processing load is transferred to the user and is therefore distributed in a large system (rather occurring for all users on the server).

In a further example, the client and server components could be run in a disconnected (or ad-hoc connectivity) mode with updates to the suggestion set being made opportunistically as clients and or server components come into periodic/ad-hoc contact. In the disconnected mode of operation, the tag suggestion set and database of tagging events may be cached when the client enters disconnected operation and may be considered a forked suggestion model i.e. the suggestion set/model will never be reconciled with the centralized state or if it is to be reconciled with the centralized state, the suggestion set/model may be restarted when the user's disconnected updates of tagging events are merged with the centralized state. Another approach is to freeze the suggestion set/model at the time a client becomes disconnected from the centralized state i.e. no further updates are done to the suggestion set/model local to the disconnected client.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person. Aspects of any of the examples described may be combined with aspects of other examples to created further examples without losing the effect sought.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. Additionally, individual blocks may be deleted from any of the methods without departing from the spirit and scope of the subject matter described herein.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of ranking and suggesting tags implemented by a processor executing computer-executable instructions contained in one or more computer-readable storage media, the method comprising:
   proposing, by the processor, a set of suggested tags to a user;
   receiving, by the processor, data identifying a tag selected by a user; and
   updating, by the processor, said set of suggested tags on the basis of at least whether said selected tag is a member of said set of suggested tags;
   wherein updating said set of suggested tags on the basis of at least whether said selected tag is a member of said set of suggested tags comprises:
       determining if said selected tag is a member of said set of suggested tags;
       if said selected tag is a member of said set, maintaining said set of suggested tags unchanged; and
       if said selected tag is not a member of said set, updating said set of suggested tags,
   wherein updating said set of suggested tags comprises:
       increasing a ranking parameter associated with said selected tag and decreasing a ranking parameter associated with each of said plurality of tags which is neither said selected tag nor a member of said set of suggested tags; and
       updating said set of suggested tags based on said ranking parameters;
   wherein the updating said set of suggested tags on the basis of at least whether said selected tag is a member of said set of suggested tags further comprises:
       updating said set of suggested tags on the basis of whether said selected tag is a member of said set of suggested tags and whether a randomly generated variable exceeds a defined threshold; and
   wherein the randomly-generated variable is generated when data identifying a tag selected by the user is received, wherein the updating occurs only when the value of the variable exceeds the threshold, wherein tag reinforcement resulting from suggesting tags in the suggestion set is mitigated.

2. A method according to claim 1, wherein said set of suggested tags are selected from a plurality of tags associated with an information object.

3. A method according to claim 2, wherein the random variable is uniformly distributed over a predetermined range and said threshold is statically set in the middle of the predetermined range.

4. A method according to claim 3, wherein said information object comprises one of a uniform resource locator (URL), a web page, a file, an image, an audio clip and a video clip.

5. A method according to claim 1, wherein the proposing the set of suggested tags to a user comprises:
   accessing said set of suggested tags; and
   displaying said set of suggested tags to said user.

6. A method according to claim 1, wherein the value of the threshold is learned dynamically based upon a weighted moving exponential average of the number of user entered tags at any given tagging.

7. A method according to claim 1, wherein updating said set of suggested tags on the basis of at least whether said selected tag is a member of said set of suggested tags comprises:
   updating said set of suggested tags on the basis of whether said selected tag is a member of said set of suggested tags and whether said selected tag meets eligibility criteria.

8. A method according to claim 1, wherein updating said set of suggested tags comprises:
   removing one of said set from said set of suggested tags, wherein said one is selected substantially at random from said set of suggested tags; and
   adding said selected tag to said set of suggested tags.

9. A method according to claim 1, wherein updating said set of suggested tags comprises:
   determining if said selected tag meets eligibility criteria; and
   if said selected tag meets said eligibility criteria, removing one of said set from said set of suggested tags, wherein said one is selected substantially at random from said set of suggested tags; and adding said selected tag to said set of suggested tags.

10. A method according to claim 9, wherein said eligibility criteria comprises: a vote count parameter associated with said selected tag exceeds a vote count parameter associated with at least one member of said set of suggested tags.

11. A method according to claim 10, further comprising:
    if said selected tag is not a member of said set, incrementing said vote count parameter associated with said selected tag.

12. A method according to claim 1, wherein updating said set of suggested tags based on said ranking parameters comprises:
    updating said set of suggested tags to comprise a subset of said plurality of tags having largest ranking parameters.

13. A method according to claim 1, wherein selecting said set of suggested tags based on said ranking parameters further comprises:
    selecting said set of suggested tags by selecting a random set of tags from said plurality of tags, wherein a probability of selection of a tag from said plurality of tags to create the random set of tags is proportional to a ranking parameter associated with each said tag of the plurality of tags.

14. A system for ranking and suggesting tags for uniform resource locators (URLs), the system comprising:
    a server in communication with a client, the server including a first processor executing computer-executable instructions contained in one or more computer readable media for implementing:
    a tag suggestion module for selecting a random second plurality of tags from a first plurality of tags associated with an information object, wherein a probability of selection of a tag as one of the random second plurality of tags is proportional to a ranking parameter associated with each said tag, wherein the tag suggestion module proposes said second plurality of tags to a user at the client as a set of suggested tags;
    a tag entry server side component for receiving from the client data identifying a tag selected by the user at the client, and for updating at least one ranking parameter associated with at least one of the first plurality of tags based on a ranking rule;

wherein said updating at least one ranking parameter associated with at least one of the first plurality of tags further comprises:

increasing at least one ranking parameter associated with said tag selected by the user and decreasing at least one ranking parameter associated with each of said first plurality of tags which is neither said tag selected by the user nor a member of said second plurality of tags; and updating said second plurality of tags based on said ranking parameters.

15. A system according to claim 14, further comprising a search module implemented by the server for searching tags by the user of the client based on rankings obtained from a plurality of users of the system.

16. A system according to claim 14, wherein said ranking rule comprises:

increasing the value of a ranking parameter associated with said tag selected by said user; and decreasing the value of a ranking parameter associated with each of the plurality of tags which is not said tag selected by said user.

17. A system according to claim 14, wherein said ranking rule comprises, if said tag selected by said user is not one of said second plurality of tags: increasing the value of a ranking parameter associated with said selected tag; and decreasing the value of a ranking parameter associated with each of the first plurality of tags which is neither said tag selected by said user nor one of said second plurality of tags.

18. A method of ranking and suggesting tags for uniform resource locators (URLs), the method comprising:

receiving notification of starting a tagging instance by a user at a client device for a currently-navigated URL, the client device including a client processor coupled to a client memory storing client-executable instructions for initiating a tagging interface at the client, wherein the tagging interface comprises an add-in for a web browser;

identifying by a server in communication with the client a suggestion set of tags corresponding to the currently navigated URL, the server including a server processor coupled to a server memory storing server-executable instructions for implementing a tag suggestion module for selecting the suggestion set of tags as a random second plurality of tags selected from a first plurality of tags associated with the currently-navigated URL based on ranking parameters associated with each of the first plurality of tags, selecting, by the tag suggestion module, the random second plurality of tags from the first plurality of tags associated with the URL, wherein a probability of selection of a tag as one of the random second plurality of tags is proportional to a ranking parameter associated with each said tag;

proposing, by the tag suggestion module said random second plurality of tags to the user at the client as the suggestion set of tags, wherein the client presents a tag entry screen on the client, the tag entry screen including a tag entry box for the user to enter one or more tags deemed relevant by the user to the currently navigated URL;

receiving data identifying a selected tag selected by a user via the tag entry screen; and updating said first plurality of tags on a basis of whether said selected tag is a member of said suggestion set of tags and whether a randomly generated variable exceeds a defined threshold, wherein the randomly-generated variable is generated for each time the user selects a tag, wherein the updating occurs only when the value of variable exceeds the threshold so that tag reinforcement resulting from suggesting tags in the suggestion set is mitigated; and when said tag selected by said user is not one of said second plurality of tags and the randomly generated variable exceeds the threshold:

increasing the value of a ranking parameter associated with said selected tag; and decreasing the value of a ranking parameter associated with each of the first plurality of tags which is neither said tag selected by said user nor one of said second plurality of tags.

* * * * *

UNITED STATES PATENT AND TRADEMARK OFFICE
CERTIFICATE OF CORRECTION

| | | |
|---|---|---|
| PATENT NO. | : 7,685,200 B2 | Page 1 of 1 |
| APPLICATION NO. | : 11/681031 | |
| DATED | : March 23, 2010 | |
| INVENTOR(S) | : Dinan Srilal Gunawardena et al. | |

It is certified that error appears in the above-identified patent and that said Letters Patent is hereby corrected as shown below:

On the Title Page, add

Column 1, item 73, change "..."

to -- Assignee: Microsoft Corporation, Redmond, WA (US) --.

Signed and Sealed this

Third Day of August, 2010

David J. Kappos
*Director of the United States Patent and Trademark Office*